(12) United States Patent
Stiller

(10) Patent No.: US 6,471,196 B2
(45) Date of Patent: Oct. 29, 2002

(54) METHOD FOR CONTROLLING THE LEVEL OF A VEHICLE BODY OF A MOTOR VEHICLE

(75) Inventor: Alexander Stiller, Garbsen (DE)

(73) Assignee: Continental Aktiengesellschaft, Hannover (DE)

(*) Notice: Subject to any disclaimer, the term of this patent is extended or adjusted under 35 U.S.C. 154(b) by 0 days.

(21) Appl. No.: 09/732,021

(22) Filed: Dec. 8, 2000

(65) Prior Publication Data
US 2001/0003386 A1 Jun. 14, 2001

(30) Foreign Application Priority Data
Dec. 8, 1999 (DE) .......................... 199 59 012

(51) Int. Cl.$^7$ .................................................. F16F 5/00

(52) U.S. Cl. ................. 267/64.16; 267/64.28; 280/6.157; 280/DIG. 1; 701/37

(58) Field of Search ........................... 267/64.16, 64.17, 267/64.28; 280/6.157, 6.158, 6.159, 5.517, DIG. 1; 701/37, 38

(56) References Cited

U.S. PATENT DOCUMENTS

| | | | | |
|---|---|---|---|---|
| 4,640,526 A | * | 2/1987 | Tanaka et al. | 280/6.157 |
| 4,965,878 A | * | 10/1990 | Yamagiwa et al. | 701/37 |
| 5,100,167 A | * | 3/1992 | Kamimura | 280/6.157 |
| 5,286,059 A | | 2/1994 | Tabe | |
| 5,652,703 A | | 7/1997 | Kawazoe | 701/37 |
| 6,173,974 B1 | * | 1/2001 | Raad et al. | 280/6.157 |

* cited by examiner

Primary Examiner—Pam Rodriguez
(74) Attorney, Agent, or Firm—Walter Ottesen

(57) ABSTRACT

The invention is directed to a method for controlling the level of a vehicle body of a motor vehicle with a level control system having a plurality of actuator elements with which the level of the vehicle body can be lowered by discharging an actuating fluid from the actuator elements. The level control system includes a control unit. A first level of the vehicle body is determined relative to a reference point directly before a discharge operation. A discharge operation of the vehicle body is initiated when the first level lies above a pregiven level. After initiating a discharge operation, a check is made in the control unit as to whether the vehicle body has lowered from the first level in accordance with an input. The discharge operation is interrupted when the vehicle body has not lowered from the first level in accordance with the input.

15 Claims, 5 Drawing Sheets

METHOD FOR CONTROLLING THE LEVEL OF A VEHICLE BODY OF A MOTOR VEHICLE

FIELD OF THE INVENTION

The invention relates a method for controlling (open loop or closed loop) the level of a vehicle body of a motor vehicle by means of a level control system having actuators with which the level of the vehicle body can be lowered by discharging an actuating means from the actuating elements. The level control system also includes a control unit which carries out the following method steps: determining the level of the vehicle body relative to a reference point; and, initiating a discharge operation of the vehicle body when the determined level lies above a pregiven level.

BACKGROUND OF THE INVENTION

Modern motor vehicles often have a level control system, for example, in the form of an air-spring system which has actuators in the form of air springs. A pregiven level is stored in the control unit of the level control system. The vehicle body is intended to assume this level compared to a fixed reference point. The pregiven level can, if required, be adapted by the driver of the motor vehicle to the actual driving situation. If, for example, an especially large ground clearance of the motor vehicle is needed offroad, then the driver can, for example, pregive a correspondingly high level in the control unit via a switch on the dashboard.

Level control systems afford the advantage that the pregiven level can be maintained independently of the loading condition of the motor vehicle by lowering or lifting the vehicle body. Furthermore, the vehicle body can also be lowered to a low level, for example, in order to facilitate a simple loading of the vehicle.

However, in a motor vehicle having a level control system, the following problems can occur. The vehicle body of the motor vehicle can seat on the ground, for example, on snow or on the ground when the vehicle is offroad. The wheels of the motor vehicle then drop away relative to the vehicle body. As a consequence of this situation, the actual level of the vehicle body can lie higher than the level, which is pregiven by the control unit, so that the control unit initiates a discharge operation of the vehicle (for example, by evacuating pressurized air out of the air springs of an air-spring system) in order to compensate the actual level to the pregiven level. This process increases the seating of the vehicle on the ground so that an unhindered further travel of the vehicle is not possible.

Another problem results when the motor vehicle is raised by means of a lift. In this case, the wheels of the vehicle deflect completely downwardly so that the vehicle body assumes a maximum level clearly above the level pregiven by the control unit. The control unit then initiates a discharge operation via which the actual level of the vehicle body is intended to adapt to the pregiven level. This takes place in that an actuating means (hydraulic liquid is evacuated in a hydraulic level control system and pressurized air is released from air springs in a pneumatic level control system) is released from the actuators of the level control system. Since the vehicle body is not lowered, the actuators are substantially emptied until only a minimum of the actuating means is held in the actuators. When reaching the minimum, a further discharge of the actuating means is prevented by a valve. When the motor vehicle is taken from the lift, the vehicle body lowers below the pregiven level because of the low level of actuating means in the actuators so that the actuators must again be filled with the actuating means in order to lift the vehicle body to the pregiven level. This is time-intensive and furthermore loads the components of the level control system with which the actuating means is conducted into the actuators.

The same problem results for a single actuator of the level control system when the wheel, which is assigned to this actuator, is lifted with a jack.

In summary, it can be seen that in specific critical situations of the motor vehicle (namely, when the vehicle body is seated on the ground or is on a lift) a lowering of the vehicle body or an emptying of the actuators of the level control system is initiated by the control unit even though this is not wanted in these situations.

SUMMARY OF THE INVENTION

It is an object of the invention to provide a method for controlling the level of a vehicle body of a motor vehicle by means of a level control system wherein a seating of the vehicle body on the ground or on a lift is detected as early as possible in order to avoid an unwanted lowering of the vehicle level.

The method of the invention is for controlling the level of a vehicle body of a motor vehicle with a level control system having a plurality of actuator elements with which the level of the vehicle body can be lowered by discharging an actuating means from the actuator elements. The level control system includes a control unit and the method includes the steps of: determining a first level of the vehicle body relative to a reference point directly before a discharge operation; initiating a discharge operation of the vehicle body when the first level lies above a pregiven level; after initiating a discharge operation, checking in the control unit as to whether the vehicle body has lowered from the first level in accordance with an input; and, interrupting the discharge operation when the vehicle body has not lowered from the first level in accordance with the input.

A discharge operation is understood to mean an operation wherein the current level of the vehicle body is intended to be adapted to a level, which is pregiven in the control unit, by discharging actuating means from the actuators of the level control system until this pregiven level is reached. Correspondingly, the interruption of a discharge operation is understood to be a prevention of a further discharge of actuating means from the actuators of the level control system even though the current level of the vehicle body is above the level pregiven in the control unit. The current level of the vehicle body is preferably determined by one or several elevation sensors.

The basic idea of the invention is that, after initiating a discharge operation via the control unit, a check is made after a short time span as to whether the vehicle body has lowered from a determined level in accordance with an input and that the control unit interrupts the discharge operation when this is not the case.

The advantages achieved with the invention are especially seen in that a discharge operation is interrupted early by the control unit when this control unit determines that the vehicle body of the motor vehicle has not lowered from the level, which was determined before the discharge operation, in accordance with an input, because, for example, the vehicle body of the motor vehicle is seated on the ground or is raised by a lift or a vehicle is on the lift with the wheels free. A vehicle body which is seated on the ground is therefore not lowered further or lowered further only minimally and a "more intense landing" of the vehicle body is thereby prevented.

A further advantage of the invention is seen in that a touchdown of the vehicle body on the ground or on the lift is automatically detected by the control unit and is interrupted. An active intervention of an operator is thereby not necessary. A further advantage of the invention is that, to execute the method of the invention, only components are necessary which are anyway present in level control systems so that the cost of the level control system is not increased notwithstanding the added comfort and safety provided.

According to another feature of the invention, the control unit interrupts the discharge operation even when the vehicle body is lowered in accordance with an input after initiation of the discharge operation but, after initiating the discharge operation, the actuating means pressure or at least a wheel contact force has been reduced beyond a pregiven amount. Based on the reduction of the actuating means pressure or the wheel standup force, the control unit determines that the vehicle has touched down, for example, on the ground, during the discharge operation. The advantage of this embodiment is that, in this case, the discharge operation is interrupted so that a harder touchdown of the vehicle on the ground is prevented.

According to another feature of the invention, only a small amount of the actuating means is discharged from the actuator after initiating a discharge operation. Preferably, the quantity of the discharged actuating means is significantly less than the quantity of the actuating means which one would have had to discharge from the actuator in order to lower the vehicle body to the pregiven level from the level determined in advance of the discharge operation. The advantage of this embodiment is that the quantity of the actuating means in the actuator is substantially retained when the check is made in the control unit as to whether the vehicle body has lowered in accordance with an input. The foregoing notwithstanding, the control unit decides whether the vehicle body seats on the ground or on a lift. If the vehicle is on a lift and is taken down from there, then it does not sink or only insignificantly compared to the level which it had before being lifted by the lift so that no or only a slight correction of the level of the vehicle body is required. A longer lifting operation thereby becomes unnecessary (in contrast, in conventional level control systems, the actuators are substantially emptied so that a longer lifting operation of the vehicle body is necessary when the vehicle is taken from the lift).

According to another feature of the invention, a plausibility consideration is executed in advance of the initiation of the discharge operation as to whether the initiation of the discharge operation can lead to a lowering of the vehicle body. A discharge operation is only initiated when this is the case. The plausibility consideration can, for example, be carried out with the aid of force sensors introduced in the tires of the motor vehicle. The wheel contact forces are determined with the aid of these sensors. When the force sensors determine a low or no wheel contact force in advance of initiating the discharge operation, then this is an indication that one or several wheels of the motor vehicle hang free in air and that therefore the motor vehicle is disposed, for example, on a lift. The initiation of the discharge operation can then not lead to a lowering of the vehicle body and is thereby not carried out. Alternatively, a plausibility consideration can be carried out in a pneumatic level control system by checking the air pressure in the air springs of the system, for example, with the aid of pressure sensors. If the air pressure in the air springs is so low that the vehicle level, which is determined in advance of the discharge operation, cannot be assumed at this air pressure even for an omitted or slight loading of the motor vehicle, this is then an indication that one or several wheels of the motor vehicle hang free in the air. The initiation of the discharge operation can in this case too not lead to a lowering of the vehicle body and therefore it is not carried out.

According to another feature of the invention, and after initiating the discharge operation, a check takes place in time intervals as to whether the vehicle body has been lowered during a time interval and the control unit interrupts the discharge operation when this is not the case. The advantage of this embodiment is that even after a short time span (typically, the time intervals have a length of 1 to 5 seconds) it can be determined whether the vehicle body has lowered at all during a time interval or has even possibly been lifted. With the aid of this feature of the invention, it can be determined rapidly during a discharge operation that the vehicle is raised with a jack or a lift. With this embodiment, the advantage is achieved that a maximum possible quantity of actuating means remains in the actuators of the level control system.

According to another embodiment, the control unit interrupts the discharge operation when, after a time span after which the vehicle body would have had to lower from the maximum level even with a minimum load, the vehicle body has not lowered from the first value.

The advantage of this embodiment is understandable when one considers that, in a level control system, in which the level of the vehicle body is lowered by discharging an actuating means from actuators, the relationship between the quantity of the actuating means in the actuators and the level of the vehicle body is not clear at the maximum level of the vehicle body. For example, the case can occur that a loaded vehicle is unloaded and, because of the unloading, the vehicle deflects into a built-in stop and so moves into the maximum level. If actuating means is discharged from the actuator in this case, then the level of the vehicle body does not sink directly out of the maximum level after initiation of the discharge operation. Instead, the vehicle body only sinks after a certain time span when so much actuating means has been discharged from the actuators that the vehicle body sinks out of the maximum level for a low vehicle weight.

In contrast, this problem is not present for a level which lies below the maximum level and above a pregiven desired level, so that the vehicle body immediately sinks after initiating the discharge operation (except when the vehicle is unloaded or lifted during the discharge operation). With this embodiment, the advantage is achieved that the discharge operation is carried out over at least a time span which is necessary in order to clearly determine whether the vehicle body would have had to sink from the actual level if the vehicle body is disposed at or close to the maximum level in advance of the discharge operation. If the vehicle body is below the maximum level, then a judgement can be made directly after initiating the discharge operation as to whether the vehicle body has lowered. Accordingly, the maximum possible quantity of actuating means remains in the actuators of the level control system at all possible levels of the vehicle body.

According to another embodiment, after a time span, a check is made in time intervals as to whether, during one of the time intervals, the vehicle body has lowered at least by a pregiven amount from the first level and whether the wheel contact forces have remained at least almost constant. The control unit interrupts the discharge operation when this is not the case.

Use can be made of the above embodiment when the level actually determined in advance of the discharge operation lies below the maximum level. In this case, the vehicle body lowers in each time interval with unchanging wheel contact forces already by a pregiven amount except if the vehicle is in a critical situation or is unloaded. The advantage of this embodiment is that a critical situation can be distinguished in the control unit from an unloading of the vehicle during a discharge operation.

According to another embodiment the discharge operation is immediately interrupted when the control unit determines that the actual value of a predetermined vehicle parameter is less than a pregiven value for this vehicle parameter.

The advantage of this embodiment is understandable when one considers the following: the fact that the vehicle body has not, during a discharge operation, lowered in accordance with an input from the level determined in advance of the discharge operation cannot perforce be attributed to the fact that the vehicle is in a critical situation. In a few cases, the fact that the vehicle body has not lowered in accordance with the input, for example, can be attributed to the fact that the vehicle is unloaded during the discharge operation and that the vehicle body has lifted for this reason. If the pregiven value for the above-mentioned vehicle parameter is so selected that it is achieved for a motor vehicle without additional loading and for all additional loadings is exceeded, then a drop below this pregiven value of the vehicle parameter can only mean that the vehicle is in a critical situation. The advantage of this embodiment is that a critical situation of the vehicle is detected very rapidly (because there is a drop below the vehicle parameter) and the unwanted discharge operation can be immediately interrupted.

According to another feature of the invention, the wheel contact force is selected as a vehicle parameter. This wheel contact force assumes a minimum value when the motor vehicle is loaded minimally or not loaded at all. If there is a drop below this minimum wheel contact force, then this is an indication that the vehicle must be in a critical situation. Because only then it is possible that there is a drop below the minimum wheel contact force. The wheel contact force can, for example, be measured by force sensors in the tires which transmit their measurement values to the control unit of the level control system by means of a transmitter. The measured values are evaluated in the control unit.

According to another feature of the invention, the level control system includes at least one air spring with which the vehicle body can be suspended and air pressure is discharged from the air spring during the discharge operation.

According to a further embodiment, air is discharged from the air spring maximally over a time span until there is a drop below a minimal air pressure in the air spring which is so pregiven that the vehicle body, even with minimum load, would have had to lower from the first level in accordance with the input. During the time span, a check is made as to whether the vehicle body has lowered from the first level in accordance with the input. The control unit interrupts the discharge operation when this is not the case up to the end of the time span.

In this embodiment, the vehicle parameter is checked after the elapse of a time span, that is, the air pressure in the air springs of the level control system is evaluated. When, after the time span, the air pressure is so low that there is a drop even below the above minimum air pressure and the motor vehicle does not lower in accordance with the input, then this is an indication that the vehicle is in a critical situation.

According to another embodiment of the invention, the maximum time span over which the air is discharged from the air springs is so selected that the air pressure in the air spring drops within the time span from a maximum air pressure to below the air pressure at minimum loading (unloaded vehicle weight). The maximum air pressure is that air pressure at which the vehicle body assumes the level determined also for maximum additional loading directly in advance of the discharge operation. The advantage is that the method can be carried out without a pressure sensor. Thus, the maximum air pressure (at which the vehicle body, also at maximum load, assumes the level determined directly in advance of the discharge operation) can be determined from a characteristic field. The same applies for the minimum air pressure at minimum additional load. The time span is determined from the most unfavorable inputs which correspond to the time span which is necessary in order to reduce the pressure (which is present at maximum loading) to a pressure level for a minimum loading. Since these pressure values are fixedly pregiven for a series manufactured vehicle, the maximum time duration for the particular level can be determined with the aid of the characteristic fields or a mathematical model formation.

According to another embodiment, the air pressure in the air spring is determined directly in advance of the discharge operation. This is followed by the step of determining over which time span pressurized air needs to be discharged from the air spring in order to drop below the minimum air pressure starting from the previously determined air pressure. The pressurized air is discharged from the air spring over maximally the predetermined time span.

Here too, the discharge operation is interrupted in advance of the elapse of the maximum time span when the vehicle body has reached the desired level. Preferably, the air pressure in the air spring is determined directly in advance of the discharge operation with the aid of a pressure sensor of the level control system. The above-mentioned time span, during which the pressurized air may be discharged from the air spring, can, for example, be determined from a characteristic field. The advantage of this embodiment is that the time span, during which the discharge operation is carried out, can be minimized. For this reason, the maximum possible quantity of pressurized air remains in the air springs of the level control system.

According to another embodiment of the invention, the method can only be carried out when the speed of the vehicle has dropped below a pregiven value. This embodiment is based on the idea that a vehicle typically is only in a critical situation when it has a low speed. Preferably, the method is only carried out when the speed of the vehicle is below 5 Km/hr. The advantage of this embodiment is that the method is only carried out when the vehicle, because of its low speed, can be in a critical situation. Discharge operations above the limit speed are carried out without interruption.

According to another embodiment of the invention, after an interruption of the discharge operation for a switched-off engine of the motor vehicle, a level change of the vehicle body (for example, by the actuation of a key) can be initiated by a person only after the engine is switched on. The advantage of this embodiment is that, when the vehicle is lifted with the aid of a jack or a lift, it is prevented that manually a level change of the system is pregiven because of lack of knowledge or carelessness and the vehicle would release itself from the hold of the jack or the lift.

According to another feature of the invention, after an interruption of the discharge operation while the engine of the vehicle is switched on, a lifting operation of the vehicle can be initiated temporarily and exclusively. The interruption of the discharge operation takes place in most cases when the engine is switched on and when the vehicle sits on the ground. With this embodiment, the advantage is accordingly achieved that an unintentional further lowering and therefore a harder seating of the vehicle on the ground is prevented.

According to still another embodiment of the invention, a discharge operation of the vehicle body can only then be initiated again when the speed of the vehicle exceeds a limit value or when a renewed switch-on of the ignition takes place after switch-off. Preferably, the limit value for the speed lies at 5 Km/hr. The advantage of this embodiment is that a discharge operation of the vehicle body can only be again initiated when, with substantial probability, the vehicle no longer sits on the ground because of its speed.

According to another embodiment of the invention, the actually determined level is below the maximum level. The advantage of this embodiment is that when the vehicle speed is derived from the drive wheels, no discharge operation is initiated when the vehicle is on a lift with a running motor and rotating drive wheels.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
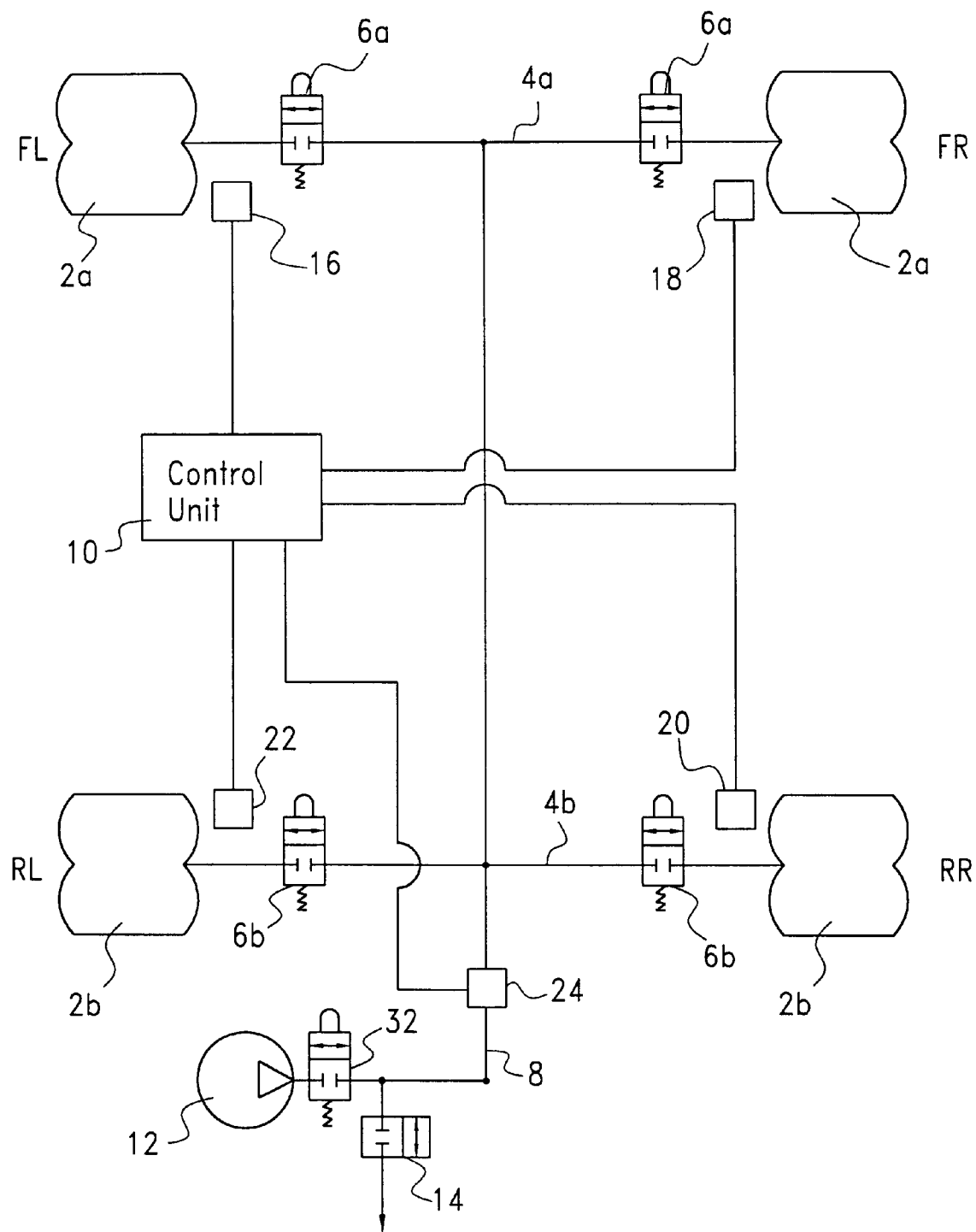
FIG. 1 is a schematic of a level control system in the context of which the method according to the invention is carried out.

FIG. 1 shows a schematic of a level control system for a motor vehicle. Only those components are shown which are needed for the description which follows.

The level control system includes air springs 2a which are assigned to the forward axles of the motor vehicle and air springs 2b which are assigned to the rear axles of the motor vehicle. A vehicle body of the motor vehicle is spring-supported with the air springs (2a, 2b). The air springs 2a are connected to each other via a transverse line 4a and the air springs 2b are connected to each other by a transverse line 4b. The transverse lines (4a, 4b) include respective transverse check valves (6a, 6b). Transverse check valves 6a are assigned to air springs 2a, respectively, and transverse check valves 6b are assigned to air springs 2b, respectively. Furthermore, the transverse lines (4a, 4b) are connected to a further line 8 via which the air springs (2a, 2b) are filled with pressurized air or through which the pressurized air can be discharged from the air springs (2a, 2b).

To fill the air springs (2a, 2b), the transverse check valves (6a, 6b) and a valve 32 are driven by the control unit 10 of the level control system so that they move from the base state shown in FIG. 1 to their other switching state and the transverse lines 4a and 4b are open. Then, the compressor 12 is driven by the control unit 10 so that the compressor pumps pressurized air into the air springs (2a, 2b). To interrupt the filling operation, the compressor 12 is stopped by the control unit 10 and the transverse check valves (6a, 6b) and the valve 32 are driven by the control unit 10 so that they assume the basic state shown in FIG. 1.

To discharge pressurized air from the air springs (2a, 2b), the transverse check valves (6a, 6b) are driven by the control unit 10 so that they move from the base state shown in FIG. 1 into the open switching state. Furthermore, the discharge valve 14 is driven by the control unit 10 so that this valve moves from the base state shown in FIG. 1 into the open switching state wherein it connects line 8 to the atmosphere. The air springs (2a, 2b) are then connected to the atmosphere via the transverse lines (4a, 4b) and via the line 8 so that pressurized air can be discharged from these air springs. In order to end or interrupt a discharge operation, the transverse check valves (6a, 6b) and the discharge valve 14 are closed by the control unit 10 so that they then again move into the base state shown in FIG. 1.

Because of the different axle loads and the different pressures as a consequence thereof in the air springs, the filling or discharge preferably takes place separately for each axle.

It is likewise possible to discharge pressurized air from an air spring or from any desired combination of air springs (for example, the air springs which are assigned to one axle) by correspondingly driving the transverse check valves (6a, 6b) and the discharge valve 14. Air spring 2b (RL) is assigned to the wheel position "rear left". In order to discharge pressurized air from air spring 2b (RL), the transverse check valve 6b, which is assigned to this air spring 2b, and the discharge valve 14 must be moved from the base state, which is shown in FIG. 1, into the opened switching state. Air spring 2b (RR) is assigned to the wheel position "rear right". If, in addition, air is to be discharged from air spring 2b (RR), then additionally, the transverse check valve 6b, which is assigned to this air spring 2b (RR), must be transferred from the base state, which is shown in FIG. 1, into the other switching state.

In addition to the components referred to above, the level control system includes elevation sensors 16, 18, 20 and 22 which are assigned to respective air springs (2a, 2b) of the level control system. With the aid of the elevation sensors 16, the actual level of the vehicle body in the region of the wheel position "front left" can be measured at any time relative to a reference point. The same applies to elevation sensors 18, 20 and 22. The actual level, which is measured by the elevation sensors 16, 18, 20 and 22, is transmitted from the sensors to the control unit 10 of the level control system and is there evaluated. At each time point, information with respect to the above is available in the control unit 10 as to which actual level the vehicle body has assumed in the region of the wheel positions of the motor vehicle compared to a pregiven reference point. Furthermore, a determination can be made in control unit 10 as to which actual level the vehicle body assumes on average relative to an axle of the motor vehicle in that the measured values of the corresponding elevation sensors are averaged. For example, if the level of the vehicle body relative to the rearward axle is to be determined, then the measurement values are averaged in the control unit 10 which are transmitted from the elevation sensors 20 and 22 to the control unit 10.

In the control unit 10, a check is made continuously as to whether the actual level of the vehicle body in the region of a wheel position or the actual level of the vehicle body relative to an axle of the motor vehicle corresponds to a pregiven level stored in the control unit 10 (the actual level is understood to be the last measurement signal stored in the control unit 10 based on the measurement signals transmitted by the elevation sensors 16, 18, 20 and 22). If the actual level lies above the pregiven levels stored in the control unit 10, then the control unit 10 initiates a discharge operation. For this purpose, the corresponding transverse check valves (6a, 6b) and the discharge valve 14 are switched as explained above. The discharge operation is ended when the control unit 10 determines that the actual level corresponds to the pregiven level stored in the control unit 10. The control unit 10 then causes the corresponding transverse check valves (6a, 6b) and the discharge valve 14 to again move into the base state shown in FIG. 1.

It can occur that the control unit 10 determines that the level of the vehicle body during a discharge operation does not lower as expected because the motor vehicle is in a critical situation. In this case, the control unit 10 interrupts the discharge operation as will be explained below in greater detail.

The level control system contains, under some circumstances, a pressure sensor 24 with which the air pressure in each individual air spring (2a, 2b) of the level control system can be measured. To measure the air pressure in the air spring 2b (RL) (which is assigned to the wheel position "rear left"), the transverse check valve 6b, which is assigned to this air spring 2b (RL), is moved by the control unit 10 from the base state shown in FIG. 1 into the other switching state; however, all other valves of the level control system remain in the base state shown in FIG. 1. In this case, the static air pressure is applied to the pressure sensor 24 which is present in air spring 2b which is assigned to the wheel position "rear left". The air pressure in the other air springs of the level control system can be correspondingly measured. The particular measurement result of the pressure sensor 24 is transmitted to the control unit 10. The transmitted measurement result is assigned in the control unit to the air spring whose transverse check valve it had driven and evaluated. How this takes place in detail will now be explained.

Figure 2:
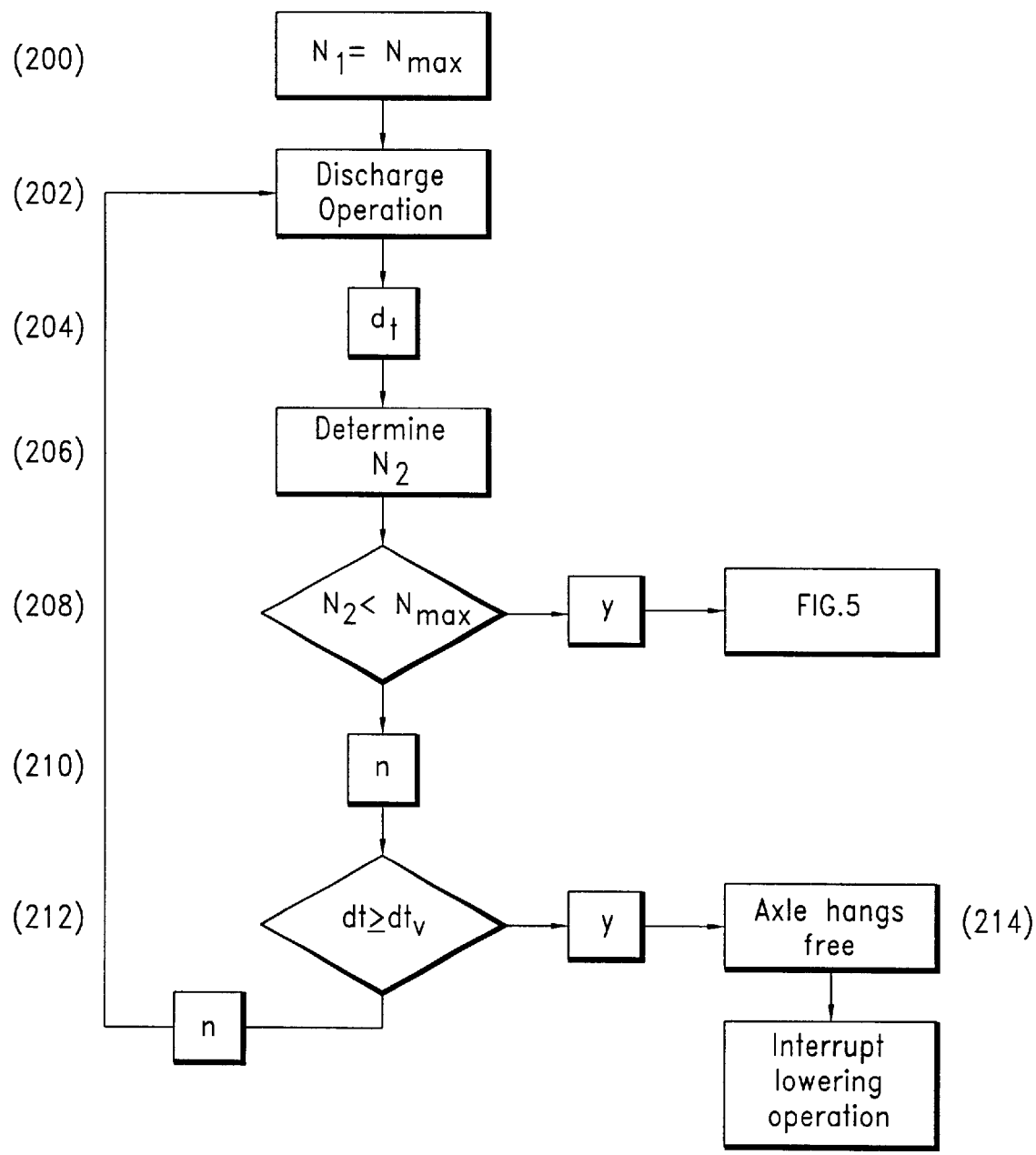
FIG. 2 is a flowchart showing an embodiment of the method according to the invention.

In connection with FIG. 2 it is now explained how a discharge operation is carried out with the aid of the control unit 10 shown in FIG. 1 when the vehicle body of the motor vehicle is at or near the maximum level $N_{max}$ relative to an axle. Here, it is assumed by way of example that the vehicle body is at the maximum level $N_{max}$ relative to the rear wheel axle. Based on the signals of the elevation sensors 20 and 22, the control unit 10 first determines that the actual level $N_1$, directly in advance of the discharge operation, corresponds to the maximum value $N_{max}$ and thereby lies above the pregiven level for the vehicle body relative to the rearward wheel axle. The control unit 10 then initiates a discharge operation in that the pressurized air is discharged from air springs 2b (for this purpose, the control apparatus controls valves shown in FIG. 1 as described above). With the initiation of the discharge operation, the control unit 10 assumes that the air pressure in the air springs 2b corresponds to the air pressure $P_{max}$ for maximum loading (see step 202). This is considered in the computation of the maximum discharge time.

After a time span dt, the actual elevation $N_2$ of the vehicle body relative to the rear axle is determined with the aid of the elevation sensors 20 and 22 in the control unit 10 and compared to the maximum level $N_{max}$ (see steps 204, 206). If the actual level $N_2$ after time span dt is less than the level $N_{max}$, the vehicle body of the motor vehicle has therefore lowered and the discharge operation is continued as it is described in connection with FIG. 5.

If after time span dt, the actual value $N_2$ is not less than $N_{max}$, then the vehicle body has therefore not lowered and the discharge operation is continued in accordance with the routine shown in FIG. 2 (see step 208).

When, because of the discharge operation, the actual level of the vehicle body does not change, the discharge operation is continued maximally until the time span dt of the entire discharge operation corresponds to a pregiven time span $dt_v$. The time span $dt_v$ is so pregiven that, within this time span, the air pressure has dropped because of the discharge of pressurized air in the air springs 2b from the maximum pressure $P_{max}$ to below a minimum air pressure $P_{min}$. Here, the air pressure $P_{min}$ in the control unit 10 is so pregiven that, for this air pressure in the air springs 2b, the vehicle body of the motor vehicle should have had to lower from the maximum level $N_{max}$ also at minimum loading or no loading (see step 212).

If the actual level $N_2$, which the vehicle body assumes after the time span $dt_v$, is not less than the maximum level $N_{max}$, then the vehicle body of the motor vehicle has not lowered. The control unit 10 then concludes that the axle hangs free in the air (for example, because the motor vehicle is disposed on a lift) and interrupts the discharge operation.

The method, which is explained in connection with FIG. 2, can be carried out without it being necessary to measure the air pressure in the air springs. Accordingly, in this case, the pressure sensor 24 shown in FIG. 1 is not needed. Furthermore, the time span $dt_v$ (over which air must be discharged from the air springs during a discharge operation), can be permanently inputted into the control unit 10 when, because of the discharge operation, the actual level of the vehicle body does not change. This is so because the maximum pressure $P_{max}$ as well as the minimum pressure $P_{min}$ and the time in which the air pressure drops from $P_{max}$ to $P_{min}$ are non-changing quantities which can be fixed once.

Figure 3:
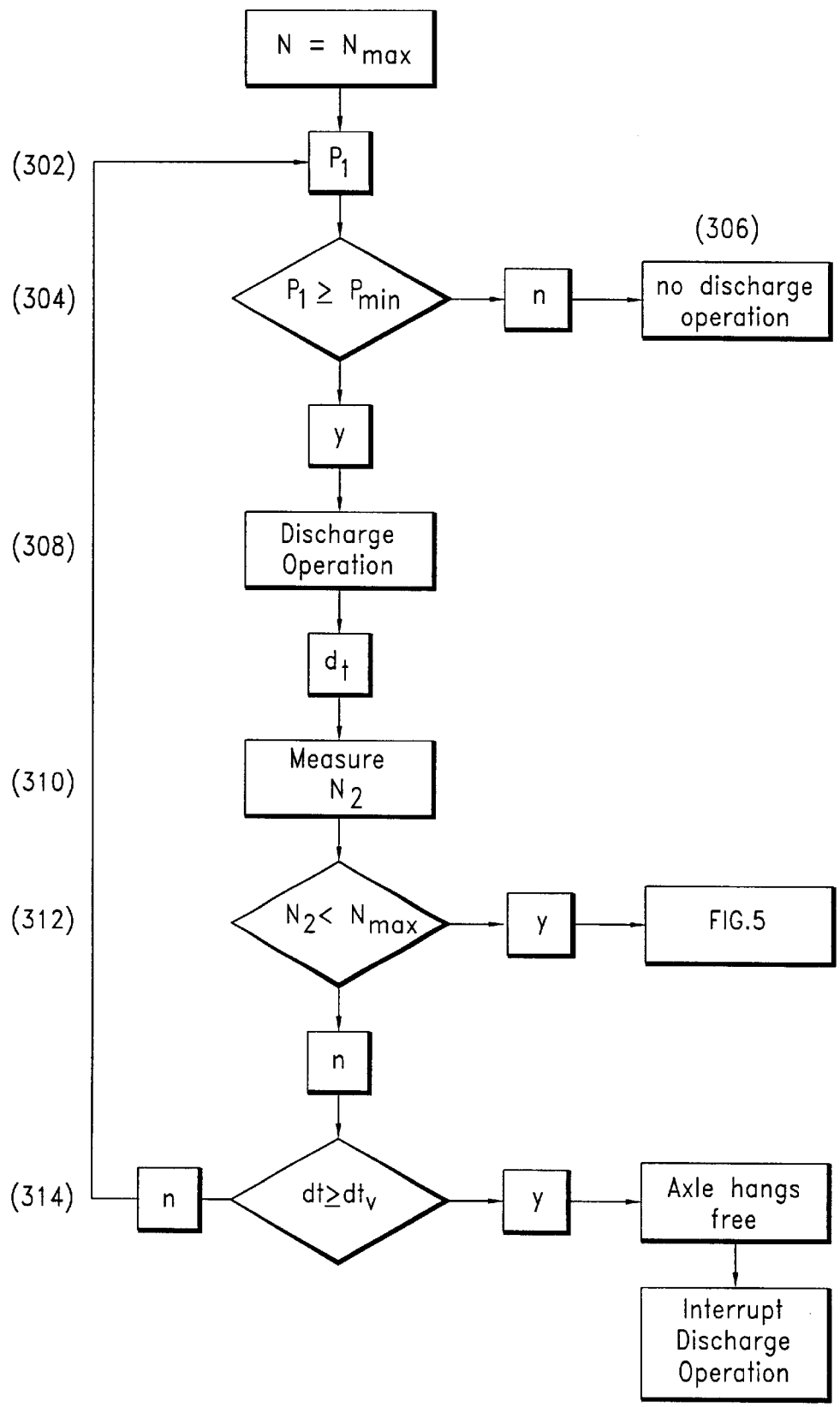
FIG. 3 is a flowchart showing another embodiment of the method of the invention.

In connection with FIG. 3, it will now be explained how the discharge operation can be undertaken advantageously when the level control system includes additionally pressure sensor 24 shown in FIG. 1. Here, it is again assumed that the vehicle body of the motor vehicle is disposed at the maximum level $N_{max}$ relative to the rear axle (this is determined by the control unit 10 based on the signals of the elevation sensors 20 and 22). First, with the aid of the pressure sensor 24, the pressure in the air springs 2b is measured as has been described in connection with FIG. 1. The measured air pressure $P_1$ in the air springs is compared to the minimum air pressure $P_{min}$ (see steps 302, 304). The air pressure $P_{min}$ is stored in the control unit 10 (preferably different values for the front and rear axles) and corresponds to the air pressure in the air springs 2b for which, when there is a drop below this air pressure, the vehicle body should lower out of the maximum level $N_{max}$ even for a minimum load or no load. If the comparison yields that the actual air pressure $P_1$ is less than the minimum air pressure $P_{min}$ in advance of the discharge operation in the air springs, then the control unit 10 concludes that the rear axle of the motor vehicle hangs free in the air because the vehicle body of the motor vehicle could not otherwise assume the maximum level $N_{max}$ relative to the rear axle. For this reason, the control unit does not initiate a discharge operation. If, in contrast, the comparison yields that the actual air pressure $P_1$ is greater or equal to the minimum air pressure $P_{min}$ in advance of the discharge operation, then a discharge operation is initiated. This takes place by discharging pressurized air from the air springs 2b as explained with respect to FIGS. 1 and 2 (see steps 306, 308).

During a time span dt, the control unit 10 determines the actual level $N_2$ based on the signals of elevation sensors 20 and 22 and compares these signals to the maximum level $N_{max}$. In dependence upon this comparison, the control is operated exactly as already explained in connection with FIG. 2.

When, because of the discharge operation, the actual level of the vehicle body does not change, the discharge operation is maximally continued until the time span dt of the total discharge operation corresponds to a pregiven time span $dt_v$. The time span $dt_v$ is so pregiven that, within this time span, the air pressure in the air springs 2b should have dropped from the pressure $P_1$ to the air pressure $P_{min}$ (how the time span $dt_v$ is determined in control unit 10, is explained in connection with FIG. 4).

The method, which is described in connection with FIG. 3, has the following advantages compared to the method described in connection with FIG. 2. In advance of initiating the discharge operation, a plausibility consideration is carried out based on the air pressure in the air springs as to whether the initiation of a discharge operation can even lead to a lowering of the vehicle body or whether the axle of the vehicle hangs free in the air. This plausibility consideration does not perforce have to take place with the aid of air pressure. Alternatively, force sensors can be embedded in the tires of the motor vehicle which measure the wheel contact forces of the wheels. If these force sensors do not show any force, then the control unit 10 concludes that the corresponding wheels of the motor vehicle hang free in the air. A further advantage of the method described in FIG. 3 is that the time span dt (during which the discharge operation is carried out maximally) is shortened compared to the time span tab in the method of FIG. 2 because the pressure in the air springs was measured in advance of the discharge operation and it is not a condition precedent that this pressure corresponds to the maximum air pressure $P_{max}$ (in a few cases, the time spans can have the same length, namely, when the measured air pressure corresponds to the maximum air pressure $P_{max}$).

Figure 4:
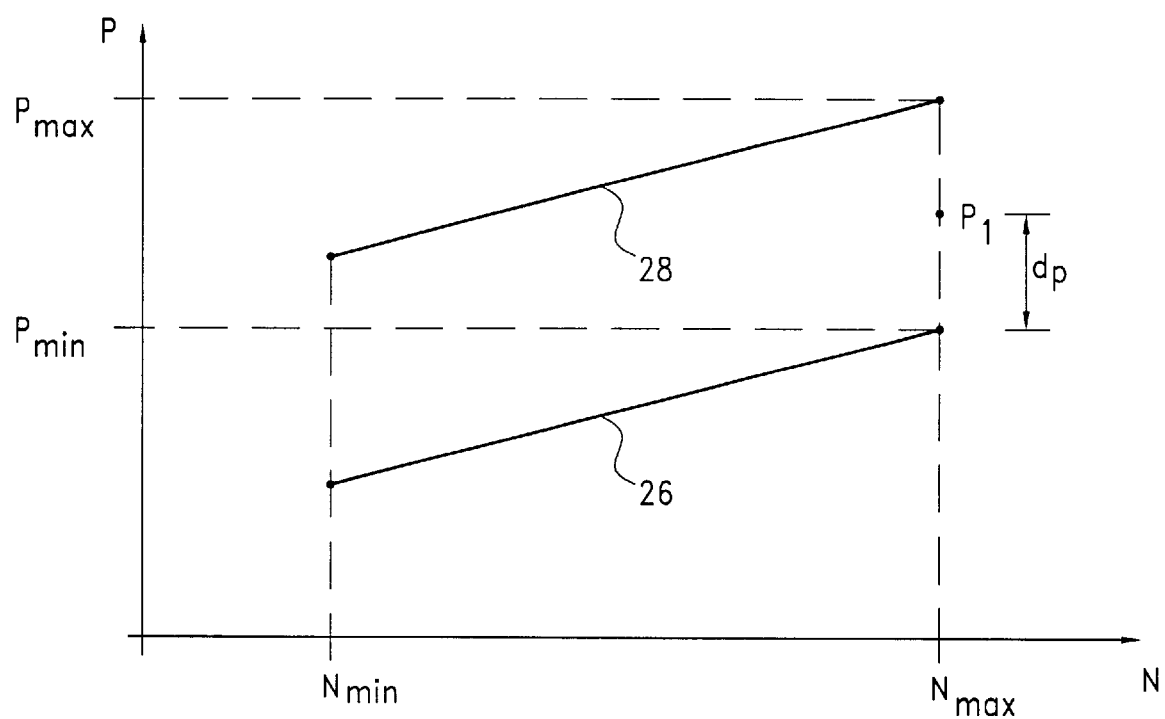
FIG. 4 is a graph showing the air pressure P in the air springs plotted as a function of the level of the vehicle body; and, FIG. 5 is a flowchart showing another embodiment of the method of the invention.

FIG. 4 shows a simplified diagram wherein the air pressure P in the air springs of the level control system is plotted against the level N of the vehicle body. The vehicle body can move between the minimum level $N_{min}$ and the maximum level $N_{max}$. The air pressure, which is present in the air springs of the level control system, is dependent for a specific level of the vehicle body additionally on the loading of the vehicle body. The characteristic line 26 shows the trace of the air pressure in the air springs in dependence upon the vehicle body level for a minimum or non-loading of the vehicle and, compared thereto, the characteristic line 28 provides the corresponding relationship for a maximum loading of the motor vehicle. For a pregiven level, the air pressure in the air springs is greater for a maximum loading than for a minimum loading or a non-loading of the vehicle body. If, in advance of a discharge operation, the maximum level $N_{max}$ is determined by the control unit (as is the case in the method of FIG. 3), then the air pressure $P_1$ in the air springs moves between the air pressure $P_{min}$ which is present at a minimum load of the vehicle body and the air pressure $P_{max}$ which is present for a maximum loading of the vehicle body. From the distance $dp=p_1-p_{min}$, the control unit 10 can compute the time span dt which is necessary in order to reduce the air pressure $P_1$ in the air springs to the value $P_{min}$. Alternatively, it is possible that for all possible values of dp, the corresponding time spans dt are stored in a characteristic line in the control unit 10 so that the control unit can determine the time dt directly from the characteristic line.

Figure 5:
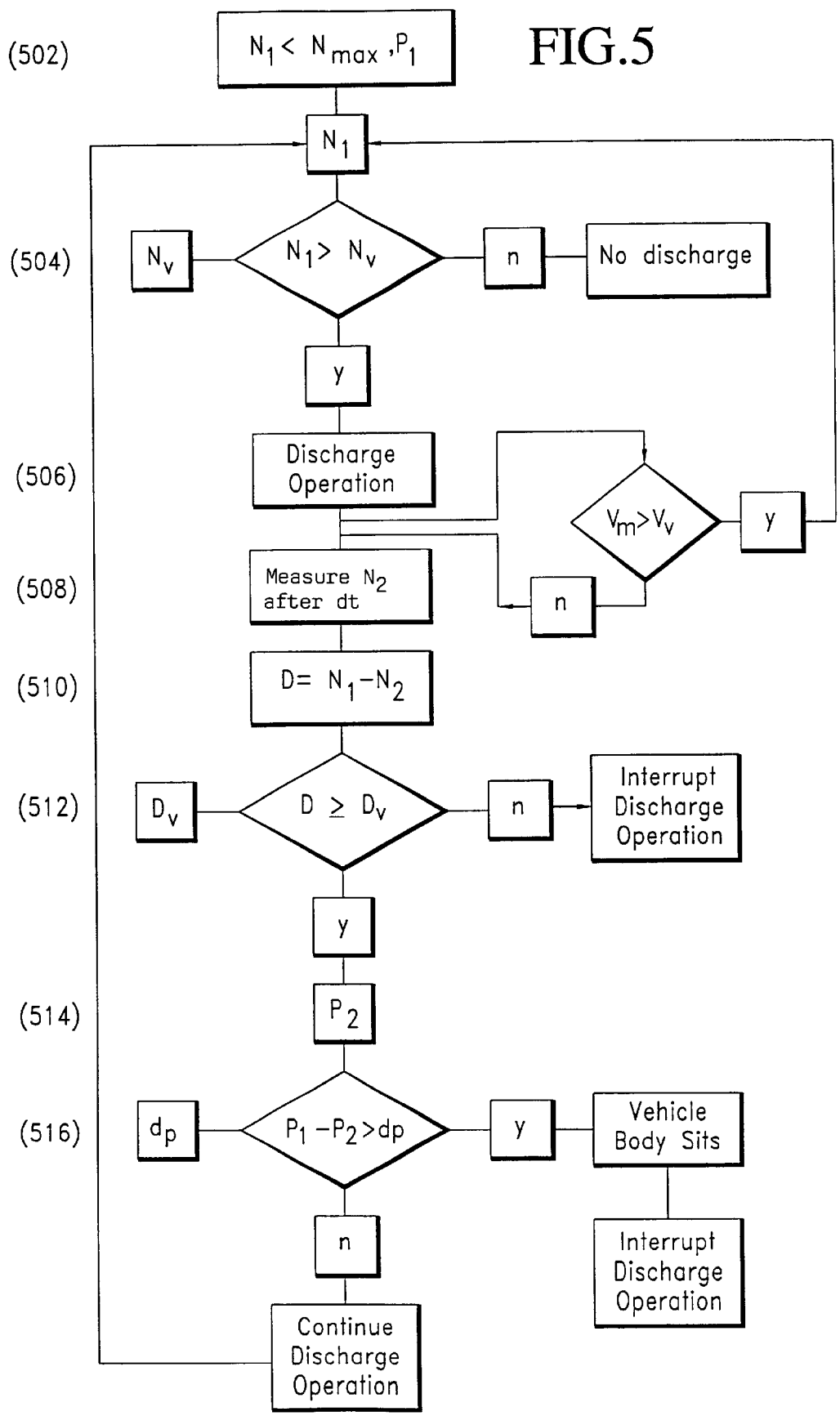

In the following, it will be explained in connection with FIG. 5 how, with the aid of the control unit 10, a discharge operation is carried out when the actual level $N_1$, which is determined directly in advance of the discharge operation or during a discharge operation from the level $N_{max}$, is less than the maximum value $N_{max}$ of the vehicle body. Here, it is assumed by way of example that a discharge operation is to be undertaken at the rear axle of the vehicle. First, the signals of the elevation sensors 20 and 22 are evaluated in the control unit 10. If it is determined that the actual level $N_1$ in advance of the discharge operation is less than the maximum value $N_{max}$, then the actual level $N_1$ is compared to the level $N_v$ pregiven in the control unit 10. The control unit 10 initiates a discharge operation only or only then continues a discharge operation begun from the value $N_{max}$ only when the actual level $N_1$ is greater than the pregiven level $N_v$. This takes place by discharging pressurized air from the air springs 2b as already described in connection with FIGS. 1 and 2. Directly in advance of the initiation of the discharge operation, the pressure $P_1$ is measured in the air springs by means of the pressure sensor 24 (see FIG. 1) and is transmitted to the control unit 10 (see steps 502, 504 and 506).

After a time span dt, the actual level $N_2$ of the vehicle body relative to the rear axle of the motor vehicle is measured again with the aid of elevation sensors 20 and 22. Corresponding signals are transmitted to the control unit 10 which determines the level $N_2$ of the motor vehicle relative to the real axle from the signals. Thereafter, in the control unit 10, a difference $D=N_1-N_2$ is determined which is an index as to what extent the vehicle body has lowered in the time span dt after initiation of the discharge operation (see steps 508 and 510).

The quantity D, which is so determined, is compared to the quantity $D_v$ determined in the control unit 10. The quantity $D_v$ is determined from construction data such as the discharge cross section, air spring volume, vehicle weight, et cetera and indicates how the vehicle body should have to lower from the level $N_1$, which is actual directly in advance of the discharge operation, within the time span dt after initiating the discharge operation when the motor vehicle is not in a critical situation. If the vehicle body has sunk at least by this quantity $D_v$ in the time span dt (that is, D greater or equal to $D_v$), then the discharge operation is continued and, with the aid of pressure sensor 24, the actual air pressure $P_2$ in the air springs 2b is determined (see steps 512 and 514).

Thereafter, in the control unit 10, the difference $P_1-P_2$ of the pressure values is formed. Based on the difference, a check is made in the control unit 10 as to how great the pressure $P_1$ has fallen within the time span dt. If the pressure difference is greater than a pregiven pressure difference dp (the pressure difference is derived, for example, from the slope of the characteristic line of FIG. 4), then the control unit 10 concludes that the vehicle body sits in the region of the rear axle of the motor vehicle. In this case, the discharge operation is interrupted by the control unit 10. If, in contrast, the pressure $P_1$ has not dropped beyond the pregiven amount dp, then the discharge operation is continued (see step 502).

Directly after initiating the discharge operation (see step 506 in FIG. 5), the actual speed $v_M$ of the motor vehicle is measured and is compared in the control unit 10 to a pregiven speed $v_v$. If the actual $v_M$ of the motor vehicle is greater than the pregiven speed, no check of the discharge operation in accordance with steps 506 to 516 in the control unit 10 takes place. Rather, only the actual level of the vehicle body is monitored with the elevation sensors 20 and 22 and the discharge operation is continued until this level reaches the pregiven level.

A check of the discharge operation according to steps 506 to 516 takes place in the control unit only when the actual speed of the vehicle is less than the pregiven speed $v_M$.

If, after the time span dt, the actual level $N_2$ of the vehicle body is measured and this level is greater than the level $N_1$ (which is the case when the vehicle body is lifted during the discharge operation) directly in advance of the discharge operation, then D becomes less than $D_v$ which leads to an interruption of the discharge operation (in this case, D becomes negative and $D_v$ is positive).

For the speed $v_M$, 5 Km/hr is preferably pregiven in the control unit 10.

It is understood that the foregoing description is that of the preferred embodiments of the invention and that various changes and modifications may be made thereto without departing from the spirit and scope of the invention as defined in the appended claims.

What is claimed is:

1. A method for controlling the level of a vehicle body of a motor vehicle with a level control system having a plurality of actuator elements with which the level of the vehicle body can be lowered by discharging an actuating means from said actuator elements, the level control system including a control unit and the method comprising the steps of:
    determining a first level of said vehicle body relative to a reference point directly before a discharge operation;
    providing force sensors introduced into the tires of the motor vehicle for determining wheel contact forces;
    when said force sensors determine that a low or no wheel contact force is present in advance of initiating said discharge operation, then disabling the initiation of said discharge operation;
    initiating a discharge operation of said vehicle body when said first level lies above a pregiven level;
    after initiating a discharge operation, checking in said control unit as to whether said vehicle body has lowered from said first level in accordance with an input;
    interrupting said discharge operation when said vehicle body has not lowered from said first level in accordance with said input;
    in advance of initiating said discharge operation, carrying out a plausibility consideration as to whether the initiation of said discharge operation can lead to a lowering of said vehicle body; and,
    initiating the discharge operation only when said plausibility consideration is satisfied.

2. The method of claim 1, comprising the further steps of:
    after initiating said discharge operation, making a check at time intervals as to whether said vehicle body has lowered during a time interval; and,
    said control unit interrupting said discharge operation when said vehicle has not lowered during said time interval.

3. The method of claim 1, wherein said first level is at or near a maximum level; and, said control unit interrupts said discharge operation when, after a time span after which said vehicle body would have had to lower from said maximum level even with a minimum load, said vehicle body has not lowered from said first level.

4. The method of claim 1, wherein said discharge operation is immediately interrupted when said control unit determines that the actual value of a predetermined vehicle parameter is less than a pregiven value for this vehicle parameter.

5. The method of claim 1, wherein said level control system includes at least one air spring with which said vehicle body is spring suspended; and, pressurized air is discharged from said air spring during discharge operation.

6. The method of claim 1, wherein said method is carried out only when the speed of said vehicle drops below a pregiven value.

7. The method of claim 1, wherein: after an interruption of a discharge operation with the engine of the motor vehicle switched off, a level change of the vehicle body can be undertaken by a person only after switching on the engine.

8. The method of claim 1, wherein temporarily, exclusively a lifting operation of the vehicle body can be initiated after an interruption of a discharge operation with the engine of the motor vehicle switched on.

9. A method for controlling the level of a vehicle body of a motor vehicle with a level control system having a plurality of actuator elements with which the level of the vehicle body can be lowered by discharging an actuating means from said actuator elements, the level control system including a control unit and the motor vehicle being subjected to wheel contact forces, the method comprising the steps of:
    determining a first level of said vehicle body relative to a reference point directly before a discharge operation;
    initiating a discharge operation of said vehicle body when said first level lies above a pregiven level;
    after initiating a discharge operation, checking in said control unit as to whether said vehicle body has lowered from said first level in accordance with an input;
    interrupting said discharge operation when said vehicle body has not lowered from said first level in accordance with said input;
    after a time span, a check is made in time intervals as to whether, during one of the time intervals, said vehicle body has lowered at least by a pregiven amount from said first level and whether the wheel contact forces have remained at least almost constant; and,
    the control unit interrupts said discharge operation when said vehicle has not lowered at least by said pregiven amount from said first level and when said wheel contact forces have not remained at least almost constant.

10. A method for controlling the level of a vehicle body of a motor vehicle with a level control system having a plurality of actuator elements with which the level of the vehicle body can be lowered by discharging an actuating means from said actuator elements, the level control system including a control unit and the method comprising the steps of:
    determining a first level of said vehicle body relative to a reference point directly before a discharge operation;
    initiating a discharge operation of said vehicle body when said first level lies above a pregiven level;
    after initiating a discharge operation, checking in said control unit as to whether said vehicle body has lowered from said first level in accordance with an input;
    interrupting said discharge operation when said vehicle body has not lowered from said first level in accordance with said input;

wherein said discharge operation is immediately interrupted when said control unit determines that the actual value of a predetermined vehicle parameter is less than a pregiven value for this vehicle parameter;

checking, as a vehicle parameter, at least one wheel contact force; and, interrupting said discharge operation when said at least one wheel contact force is less than a minimum wheel contact force which is so pregiven that said minimum wheel contact force is generated by said vehicle body even with minimum loading.

11. A method for controlling the level of a vehicle body of a motor vehicle with a level control system having a plurality of actuator elements with which the level of the vehicle body can be lowered by discharging an actuating means from said actuator elements, the level control system including a control unit and the method comprising the steps of:

determining a first level of said vehicle body relative to a reference point directly before a discharge operation;

initiating a discharge operation of said vehicle body when said first level lies above a pregiven level;

after initiating a discharge operation, checking in said control unit as to whether said vehicle body has lowered from said first level in accordance with an input;

interrupting said discharge operation when said vehicle body has not lowered from said first level in accordance with said input;

wherein said level control system includes at least one air spring with which said vehicle body is spring suspended; and, pressurized air is discharged from said air spring during a discharge operation;

discharging air from said air spring maximally over a time span until there is a drop below a minimal air pressure in said air spring which is so pregiven that said vehicle body, even with minimum load, would have had to lower from said first level in accordance with the input;

during said time span, checking as to whether said vehicle body has lowered from said first level in accordance with said input; and, said control unit interrupting said discharge operation when said vehicle body has not lowered from said first level in accordance with said input up to the end of said time span.

12. The method of claim 11, comprising the further step of:

so selecting the maximum time span over which air is discharged from said air spring that the air pressure in said air spring falls within said time span from a maximum air pressure at which said vehicle body assumes said first level even for a maximum load to below the air pressure of minimum loading.

13. The method of claim 11, comprising the further steps of:

determining the air pressure in said air spring directly in advance of said discharge operation;

determining over which time span pressurized air needs to be discharged from said air spring in order to drop below the minimum air pressure starting from said previously determined air pressure; and, discharging pressurized air from said air spring over maximally the predetermined time span.

14. A method for controlling the level of a vehicle body of a motor vehicle with a level control system having a plurality of actuator elements with which the level of the vehicle body can be lowered by discharging an actuating means from said actuator elements, the level control system including a control unit and the method comprising the steps of:

determining a first level of said vehicle body relative to a reference point directly before a discharge operation;

initiating a discharge operation of said vehicle body when said first level lies above a pregiven level;

after initiating a discharge operation, checking in said control unit as to whether said vehicle body has lowered from said first level in accordance with an input;

interrupting said discharge operation when said vehicle body has not lowered from said first level in accordance with said input;

wherein temporarily, exclusively a lifting operation of the vehicle body can be initiated after an interruption of a discharge operation with the engine of the motor vehicle switched on; and, wherein the discharge operation of the vehicle body can only then be initiated again when the speed of the motor vehicle has exceeded a limit value or when, after a switch off of the ignition, a renewed switch-on of the ignition takes place.

15. The method of claim 14, wherein, additionally, said first level is below the maximum level.

* * * * *